United States Patent
Shin et al.

(10) Patent No.: US 9,466,097 B2
(45) Date of Patent: Oct. 11, 2016

(54) APPARATUS AND METHOD FOR REMOVING FOG IN IMAGE

(71) Applicant: HYUNDAI MOTOR COMPANY, Seoul (KR)

(72) Inventors: Dong In Shin, Yongin-si (KR); Won Seok Lee, Seongnam-si (KR); Ha Yong Woo, Seoul (KR); Hwa Young Kim, Uiwang-si (KR); Jin Hyuk Choi, Miryang-si (KR); Dong Eon Oh, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 14 days.

(21) Appl. No.: 14/564,027

(22) Filed: Dec. 8, 2014

(65) Prior Publication Data

US 2015/0371373 A1    Dec. 24, 2015

(30) Foreign Application Priority Data

Jun. 20, 2014 (KR) .................. 10-2014-0075851

(51) Int. Cl.
*G06K 9/40* (2006.01)
*G06T 5/00* (2006.01)

(52) U.S. Cl.
CPC ..... *G06T 5/007* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,960,102 A * | 9/1999 | Van Eeuwijk | ....... | A61B 6/5252 378/160 |
| 8,249,303 B2 * | 8/2012 | Nitanda | .................. | G06T 5/002 382/104 |
| 8,340,461 B2 * | 12/2012 | Sun | .......................... | G06K 9/40 358/3.26 |
| 8,755,628 B2 * | 6/2014 | Fang | ....................... | G06T 5/009 382/274 |
| 8,774,555 B2 * | 7/2014 | Xianghui | ................ | G06T 5/003 382/274 |
| 8,897,588 B2 * | 11/2014 | Wang | ..................... | G06T 5/003 382/255 |
| 8,923,650 B2 * | 12/2014 | Wexler | ................... | G01C 11/04 382/286 |
| 9,208,581 B2 * | 12/2015 | Wexler | ................... | G01C 11/04 |
| 2008/0317287 A1 | 12/2008 | Haseyama | | |
| 2010/0322478 A1 | 12/2010 | Nitanda | | |
| 2011/0188775 A1 * | 8/2011 | Sun | .......................... | G06K 9/40 382/274 |
| 2013/0071043 A1 | 3/2013 | Bai | | |
| 2014/0140633 A1 * | 5/2014 | Wang | ................... | G06K 9/6255 382/255 |

FOREIGN PATENT DOCUMENTS

| | | |
|---|---|---|
| JP | 2008-310509 A | 12/2008 |
| JP | 2010-287183 A | 12/2010 |
| JP | 2013-058202 A | 3/2013 |
| KR | 10-2010-0021952 A | 2/2010 |
| KR | 10-2013-0015906 A | 2/2013 |
| KR | 10-1361644 B1 | 2/2014 |
| KR | 10-2014-0026747 A | 3/2014 |

OTHER PUBLICATIONS

Taeha UM et al., "Dehazing in HSI Color Space with Color Correction", JBE, vol. 18, No. 2, Mar. 2013.

* cited by examiner

*Primary Examiner* — Feng Niu

(74) *Attorney, Agent, or Firm* — McDermott Will & Emery LLP

(57) ABSTRACT

The present disclosure relates to an apparatus and a method for removing fog in an image capable of providing a defogged image without a sense of difference by adaptively controlling defogging parameters in response to a density of fog to remove fog.

5 Claims, 6 Drawing Sheets

APPARATUS AND METHOD FOR REMOVING FOG IN IMAGE

CROSS-REFERENCE TO RELATED APPLICATION

This application is based on and claims the benefit of priority to Korean Patent Application No. 10-2014-0075851, filed on Jun. 20, 2014 in the Korean Intellectual Property Office, the disclosure of which is incorporated herein in its entirety by reference.

TECHNICAL FIELD

The present disclosure relates to an apparatus and a method for removing fog in an image, and more particularly, to a technology of providing a defogged image without a sense of difference by adaptively controlling defogging parameters in response to a density of fog.

BACKGROUND

Fog is the phenomenon that water vapor in the atmosphere is condensed and floats around the surface of the earth. Since the fog has a particle larger than that of air, light is more scattered and an image obtained under the fog has reduced contrast and chroma due to the scattering of light.

The image under the fog has low contrast and low color fidelity and thus accurate object recognition under the fog is impossible.

An existing technology for removing fog in an image based on dark channel prior (DCP) removes fog using a transmission map depending on the following Equation 1 or Equation 2. In this case, as defogging parameters, A is set to be a brightest pixel value of an image or a brightness value corresponding to a dark channel of 0.01% and w is set to be a fixed value.

$$T=1-w\times\min(\min(RGB/A)) \quad \text{[Equation 1]}$$

$$T=1-w\times\mathrm{med}(\min(RGB/A)) \quad \text{[Equation 2]}$$

In the Equations 1 and 2, T means a transmission map which represents a scattering degree of light depending on a distance and w means a weight.

Therefore, the existing technology of removing fog in an image sets the defogging parameters without considering a density of fog and therefore causes deterioration in defogging performance.

In particular, the existing technology of removing fog in an image have no effect on a side mirrorless system which provides a rear side image of a vehicle to a driver through a display without side mirrors.

SUMMARY

The present disclosure has been made to solve the above-mentioned problems occurring in the prior art while advantages achieved by the prior art are maintained intact.

An aspect of the present disclosure provides an apparatus and a method for removing fog in an image capable of providing a defogged image without a sense of difference by adaptively controlling defogging parameters in response to a density of fog to remove fog.

According to an exemplary embodiment of the present disclosure, an apparatus for removing fog in an image, includes a brightness curve generator configured to generate a brightness curve which represents an average brightness value of pixels within rows for each row position in a pixel unit in an image; a maximum variation point detector configured to detect a position at which a difference between brightness values on the brightness curve generated by the brightness curve generator is largest; a normalization value detector configured to detect a normalization value based on the brightness value at a maximum variation point detected by the maximum variation point detector; a weight determiner configured to determine a weight depending on a relative position of the maximum variation point detected by the maximum variation point detector on the basis of a vanishing point of the image; and a controller configured to remove fog from the image based on the normalization value detected by the normalization value detector and the weight determined by the weight determiner.

According to another exemplary embodiment of the present disclosure, a method for removing fog in an image, includes generating, by a brightness curve generator, a brightness curve which represents an average brightness value of pixels within rows for each row position in a pixel unit in an image; detecting, by a maximum variation point detector, a position at which a difference between brightness values on the generated brightness curve is largest as a maximum variation point; detecting, by a normalization value detector, a normalization value on the basis of the brightness value at the detected maximum variation point; determining, by a weight determiner, a weight depending on a relative position of the detected maximum variation point, on the basis of a vanishing point of the image; and removing, by a controller, fog from the image on the basis of the detected normalization value and the determined weight.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
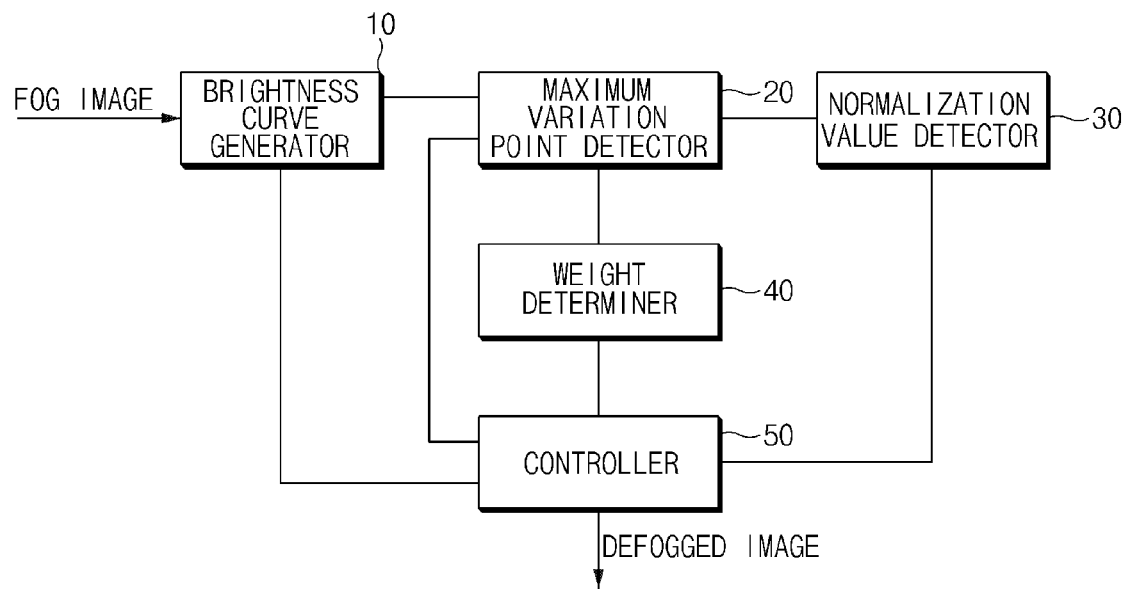
FIG. 1 is a diagram illustrating an apparatus for removing fog in an image according to an exemplary embodiment of the present disclosure.

FIG. 1 is a diagram illustrating an apparatus for removing fog in an image according to an exemplary embodiment of the present disclosure.

As illustrated in FIG. 1, the apparatus for removing fog in an image according to the exemplary embodiment of the present disclosure includes a brightness curve generator 10, a maximum variation point detector 20, a normalization value detector 30, a weight determiner 40, and a controller 50.

The brightness curve generator 10 generates a brightness curve which represents an average brightness value of pixels within rows for each row position in a pixel unit in an image.

Generally, an image is a set (matrix) of pixels. A row mentioned herein is a row in a matrix comprising pixels. Further, a new concept row having at least one row as a group may also be introduced.

Figure 2:
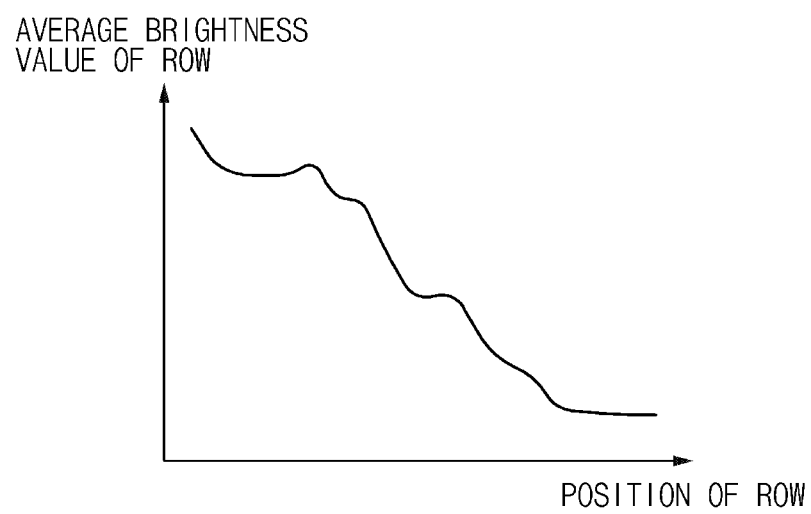
FIG. 2 is an example of a brightness curve according to an exemplary embodiment of the present disclosure.

FIG. 2 illustrates an example of a brightness curve generated by the brightness curve generator 10.

In FIG. 2, an x axis represents a row position in a pixel unit and a y axis represents an average brightness value of pixels which configure a row.

Next, the maximum variation point detector 20 detects a position $g_i$ at which a difference between brightness values on the brightness curve generated by the brightness curve generator 10 is largest.

Hereinafter, a function of the maximum variation point detector 20 will be described in detail with reference to FIG. 3.

Figure 3:
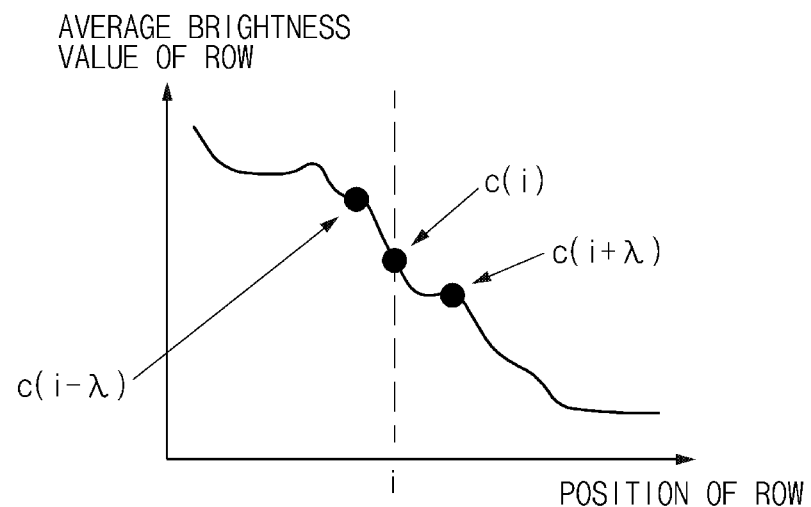
FIG. 3 is an example of a maximum variation point on the brightness curve according to an exemplary embodiment of the present disclosure.

As illustrated in FIG. 3, the maximum variation point detector 20 detects as the maximum variation point the position $g_i$ at which a difference between a brightness value $c$ $(i-\lambda)$ at a point spaced to the left by a predetermined value $\lambda$ and a brightness value $c$ $(i+\lambda)$ at a point spaced to the right by a predetermined value $\lambda$ is largest, on the basis of a brightness value $c$ $(i)$ at any point on the brightness curve. Here, the position at which the difference between the brightness values is largest means a contact at which a magnitude of a gradient of a straight line tangent to a curved line is largest.

In this case, the maximum variation point detector 20 detects the maximum variation point $g_i$ depending on the following Equation 3.

$$g_i = \arg\max_i(\Delta(i,\lambda)), \Delta(i,\lambda) = |c(i-\lambda) - c(i+\lambda)| \quad \text{[Equation 3]}$$

Next, the normalization value detector 30 detects a normalization value L based on a brightness value $c$ $(g_i)$ at the maximum variation point which is detected by the maximum variation point detector 20. That is, the normalization value detector 30 detects the normalization value L based on the following Equation 4.

$$L = \min(c(g_i) + \alpha, 1) \quad \text{[Equation 4]}$$

In the above Equation 4, $\alpha$ represents a marginal value which prevents image saturation.

Next, the weight determiner 40 determines a weight $\tilde{w}$ depending on a relative position between a vanishing point of an image and the maximum variation point detected by the maximum variation point detector 20.

That is, the weight determiner 40 determines the weight depending on the relative position of the maximum variation point on the basis of the vanishing point in the image.

Hereinafter, a function of the weight determiner 40 will be described in detail with reference to FIG. 4.

Figure 4:
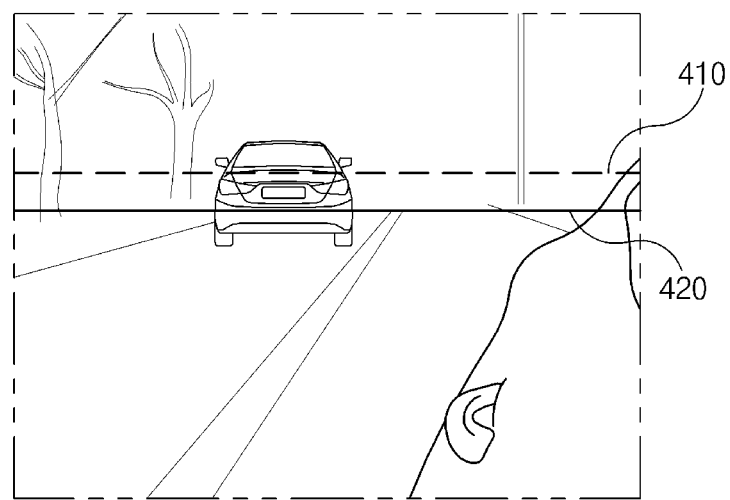
FIG. 4 is an example of a process of determining a weight according to an exemplary embodiment of the present disclosure.

In FIG. 4, reference numeral '410' represents the vanishing point (accurately, a horizontal line including the vanishing point) in the image and reference numeral '420' represents the maximum variation point (accurately, a horizontal line including the maximum variation point).

Further, the position value in the image increases toward a lower portion of the image. That is, the lower portion of the image has a largest position value and an upper portion of the image has a lowest position value. Therefore, a position value of reference numeral '410' is smaller than that of reference numeral '420'.

Further, as fog is thickened, reference numeral '420' is away from reference numeral '410' downwardly with respect to the reference numeral '410'. Therefore, as the reference numeral '420' becomes away from the reference numeral '410,' the weight is increased, thereby increasing a defogging effect.

The weight determiner 40 determines the weight $\tilde{w}$ depending on the following Equation 5.

$$\tilde{W} = \begin{cases} \min\{k \cdot (g_j - v) + w_{min}, w_{max}\} & g_j > v \\ w_{min} & \text{otherwise} \end{cases} \quad \text{[Equation 5]}$$

In the above Equation 5, k represents a convergence rate control constant, v represents the position of the vanishing point in the image, $w_{min}$ represents a minimum weight, and $w_{max}$ represents a maximum weight.

Next, the controller 50 controls each component to normally perform their own functions.

In particular, the controller 50 removes fog from the image based on the normalization value detected by the normalization value detector 30 and the weight determined by the weight determiner 40. That is, the controller 50 removes fog from the image depending on the following Equation 6.

$$\tilde{J} = \frac{Y - L}{T'} - L, T' = 1 - \tilde{w} \times \min[\min(\min(RGB/L)), 1] \quad \text{[Equation 6]}$$

In the above Equation 6, $\tilde{J}$ represents an image from which fog is removed, Y represents an input image (brightness image), L represents the normalization value, T' represents the transmission map, and $\tilde{w}$ represents the weight.

Further, T' may also be replaced by the following Equation 7.

$$T' = 1 - \tilde{w} \times \min[\text{med}(\min(RGB/L)), 1] \quad \text{[Equation 7]}$$

For reference, the dark channel used in the exemplary embodiment of the present disclosure is a generally widely used technology and a method for removing fog from an image is not a gist of the present disclosure.

The exemplary embodiment of the present disclosure removes fog from the image as the related art, but newly defines the defogging parameters (normalization value and weight) and adaptively sets the defogging parameters in response to the density of fog, thereby increasing the defogging effect.

Meanwhile, the exemplary embodiment of the present disclosure may be applied to the side mirrorless system of a vehicle. In this case, to reduce the time required to remove fog, it is preferable to remove fog from a specific region (region of interest), not to remove fog from all the rear side images of the vehicle photographed by a camera.

Figure 5:
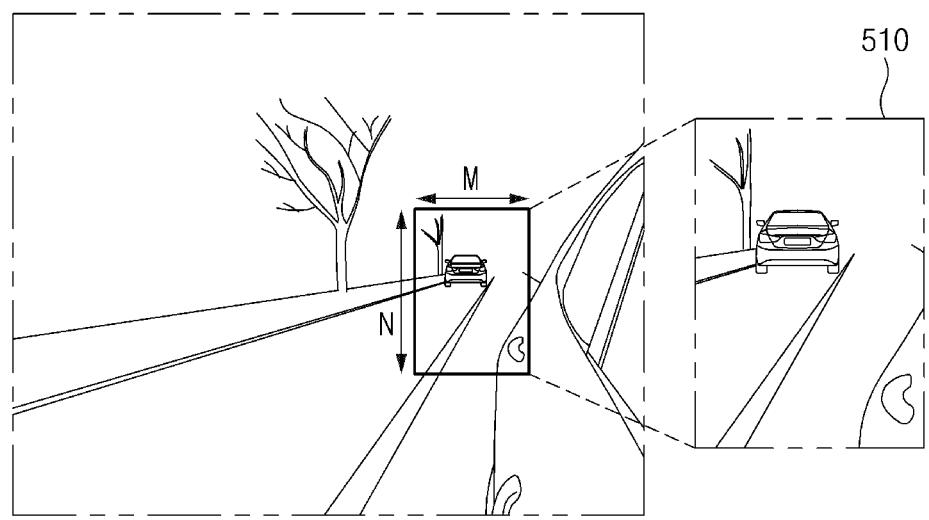
FIG. 5 is an example of a region of interest in an image according to an exemplary embodiment of the present disclosure.

To this end, the exemplary embodiment of the present disclosure may further include a region of interest extractor (not illustrated). As illustrated in FIG. 5, the region of interest extractor extracts a region of interest 510 having an N×M (here, N and M represent the number of pixels) size in the overall image, in which a position of the region of interest 510 is fixed. That is, the position of the region of interest 510 is preferably a position at which it is tangent to a rear side of an own vehicle so that a driver may confirm other vehicles positioned at the rear side of the own vehicle.

The region of interest image extracted by the region of interest extractor is input to the brightness curve generator 10.

Figure 6:
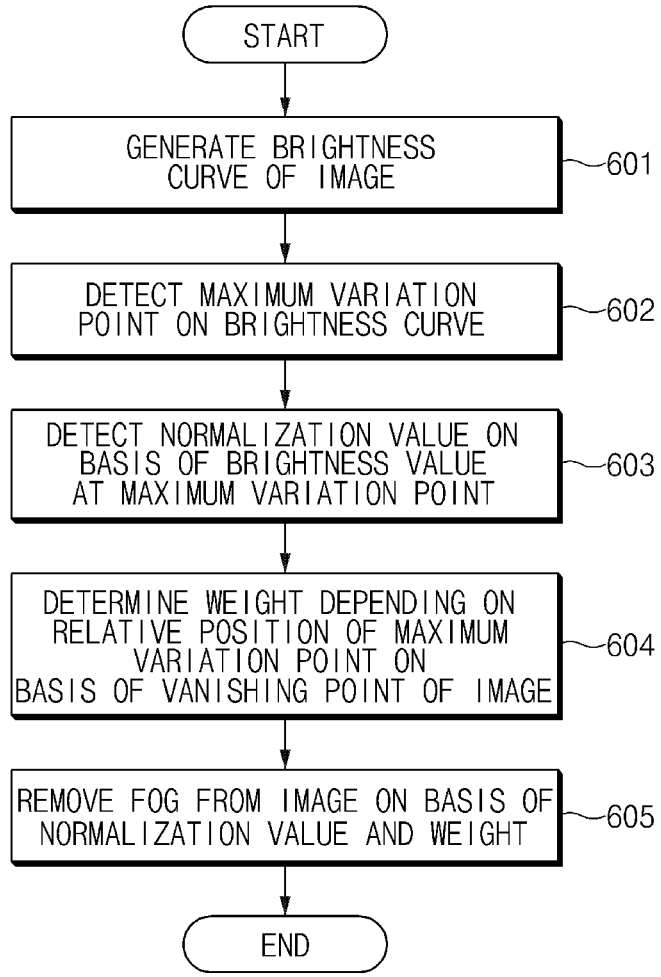
FIG. 6 is a flow chart of a method for removing fog in an image according to an exemplary embodiment of the present disclosure.

FIG. 6 is a flow chart of a method for removing fog in an image according to an exemplary embodiment of the present disclosure.

First of all, the brightness curve generator 10 generates a brightness curve which represents an average brightness value of pixels within rows for each row position in a pixel unit in an image (601).

Next, the maximum variation point detector 20 detects, as the maximum variation point, the position at which the difference between the brightness values on the brightness curve generated by the brightness curve generator (602).

Next, the normalization value detector 30 detects the normalization value based on the brightness value at the maximum variation point detected by the maximum variation point detector 20 (603).

Next, the weight determiner 40 determines the weight depending on the relative position of the maximum variation point detected by the maximum variation point detector 20 on the basis of the vanishing point of the image (604).

Next, the controller 50 removes fog from the image based on the normalization value detected by the normalization value detector 40 and the weight determined by the weight determiner 40 (605).

By the process, it is possible to provide the defogged image without the sense of difference.

As described above, according to the exemplary embodiments of the present disclosure, it is possible to provide the defogged image without the sense of difference by adaptively controlling the defogging parameters in response to the density of fog to remove fog.

Further, it is possible to apply the apparatus and method for removing fog in an image to the side mirrorless system of the vehicle according to the exemplary embodiments of the present disclosure by adaptively controlling the defogging parameters in response to the density of fog to remove fog.

As described above, although the present disclosure has been described with reference to exemplary embodiments and the accompanying drawings, it would be appreciated by those skilled in the art that the present disclosure is not limited thereto but various modifications and alterations might be made without departing from the scope defined in the following claims.

What is claimed is:

1. A method for removing fog in an image, comprising:
generating, by a controller, a brightness curve which represents an average brightness value of pixels within rows for each row position in a pixel unit in the image;
detecting, by the controller, a position $g_i$ at which a difference between a brightness value $c(i-\lambda)$ at a point spaced to the left by a predetermined value $\lambda$ and a brightness value $c(i+\lambda)$ at a point spaced to the right by the predetermined value $\lambda$ is largest as a maximum variation point on the basis of a brightness value $c(i)$ at any point on the brightness curve;
detecting, by the controller, a normalization value on the basis of the brightness value at the detected maximum variation point;
determining, by the controller, a weight depending on a relative position of the detected maximum variation point, on the basis of a vanishing point of the image; and
removing, by the controller, fog from the image on the basis of the detected normalization value and the determined weight.

2. The method according to claim 1, wherein in the detecting of the normalization value, a smaller value of a result value obtained by adding a marginal value to the brightness value at the maximum variation point and 1 is detected as the normalization value.

3. The method according to claim 1, wherein in the determining of the weight, the weight is increased as the maximum variation point is away from the vanishing point downwardly based on the vanishing point.

4. The method according to claim 1, wherein the image is a rear side image of a vehicle.

5. The method according to claim 4, further comprising:
extracting, by the controller, a region of interest having a predetermined size which is tangent to the rear side of the vehicle from the rear side image.

\* \* \* \* \*